United States Patent [19]

Betensky

[11] Patent Number: 4,991,943

[45] Date of Patent: Feb. 12, 1991

[54] COMPACT ZOOM LENS WITH HIGH ZOOM RATIO

[75] Inventor: Ellis I. Betensky, Redding, Conn.

[73] Assignee: Lenzar Optics Corp., Riviera Beach, Fla.

[21] Appl. No.: 329,283

[22] Filed: Mar. 27, 1989

[51] Int. Cl.$^5$ .............................................. G02B 15/14
[52] U.S. Cl. ...................................................... 350/427
[58] Field of Search .......................................... 350/427

[56] References Cited

U.S. PATENT DOCUMENTS 3,192,829  7/1965  Yamaji ................................. 350/427

Primary Examiner—Bruce Y. Arnold
Assistant Examiner—Rebecca D. Gass
Attorney, Agent, or Firm—Robert H. Montgomery

[57] ABSTRACT

A compact high zoom ratio lens comprising from the object end a front positive stationary lens unit, a negative variating lens unit, a positive variating lens unit and a compensate lens unit, the variating lens units and the compensator lens unit being axially moveable to vary the equivalent focal length of said lens, the compensator group having an object magnification change of less than twenty-five percent over the zoom range of the lens.

26 Claims, 2 Drawing Sheets

COMPACT ZOOM LENS WITH HIGH ZOOM RATIO

FIELD OF THE INVENTION

This invention relates to zoom lenses and more particularly a catadioptric zoom lens.

BACKGROUND OF THE INVENTION

The change in the focal length of a zoom lens is accomplished by an internal change of magnifications of the lens groups which move during zooming. A conventional zoom lens used in thirty-five millimeter photography for single lens reflex cameras comprises four groups where there is a first fixed or focusing group, a second variator group which provides the great majority of change of magnification of the lens, a third compensator group which maintains the image in focus, and a fourth relay or objective lens. In most of these zoom lenses, the focal length ratio over the zoom range is approximately three to one or less, and only the variator moving group is necessary since aberrations are usually stable for magnifications of about $1/\sqrt{3}$ to $\sqrt{3}$. The compensator group provides little, if any, of the magnification change. To increase the zooming range, it is necessary to provide an additional source of magnification change, usually an additional motion. One lens group motion can be extended to a magnification change of greater than three to one, but only at the expense of increased size.

Many zoom lenses having more than one "zooming" group have been proposed, but to achieve compactness in both length and diameter, such lenses usually include movement of the front or first group for zooming. If, however, for other system considerations, it is undesirable to move the first group, then the two motions should occupy the same space for minimum size; that is, while one zooming group is moving to change magnification, the other is providing image plane compensation, and then the first moving group compensates while the second provides the primary change of magnification. Such system is capable of a large focal length range within a minimum size, and is limited only by the fact that two variating groups can become a focal as a unit in the mid-range position, and would not necessarily provide for a constant image position for the entire focal length range.

Accordingly, the present invention provides a very compact zoom lens with a large zoom range and the front vertex distance remains constant over the zoom range. That is, the front group does not move for zooming, but may move for focusing.

SUMMARY OF THE INVENTION

Briefly stated, the invention in one form thereof comprises a zoom lens which includes a first fixed front group which may be movable for focusing but does not contribute to zooming, a second zooming group which provides a variating and compensating function, a third zooming group which also provides a variating and compensating function, and a fourth group which provides an additional compensating function but which introduces insignificant amounts of aberration due to the fact that both the object and pupil magnifications do not change substantially. In this way, the number of lens elements can be minimized, which reduces manufacturing costs and maximizes the amount of space available for zooming while providing a compact zoom lens.

An object of this invention is to provide a new and improved zoom lens of small fixed front vertex distance with a extremely large zoom range.

Another object of this invention is to provide a compact zoom lens having two variating and compensating groups for increasing the focal range and further including a compensating group that has little change in magnification when moving during zooming.

A further object of this invention is to provide a zoom lens of the type described in which the number of lens elements are minimized, which reduces manufacturing costs, and maximizes the amount of space available within the lens for zooming without utilizing a front zooming group.

The features of the invention which are believed to be novel are particularly pointed out and distinctly claimed in the concluding portion of the specification. The invention, however, both as to its organization and operation, together with further objects and advantages thereof, may best be appreciated by reference to the following detailed description taken in conjunction with the drawings.

DETAILED DESCRIPTION OF PREFERRED EMBODIMENTS OF THE INVENTION

Figure 1:
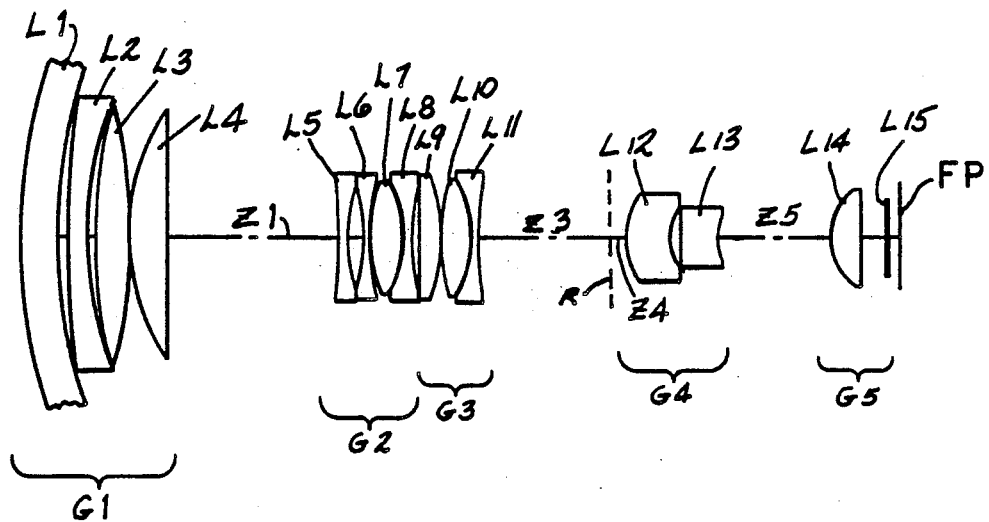
FIGS. 1 and 1a are schematic side elevation of a lens embodying the invention in the long and short focal length positions respectively and FIGS. 2 and 2a are a diagram similar to FIG. 1 but showing another lens embodying the invention in its short and long focal focal length positions, respectively.
Figure 1A:
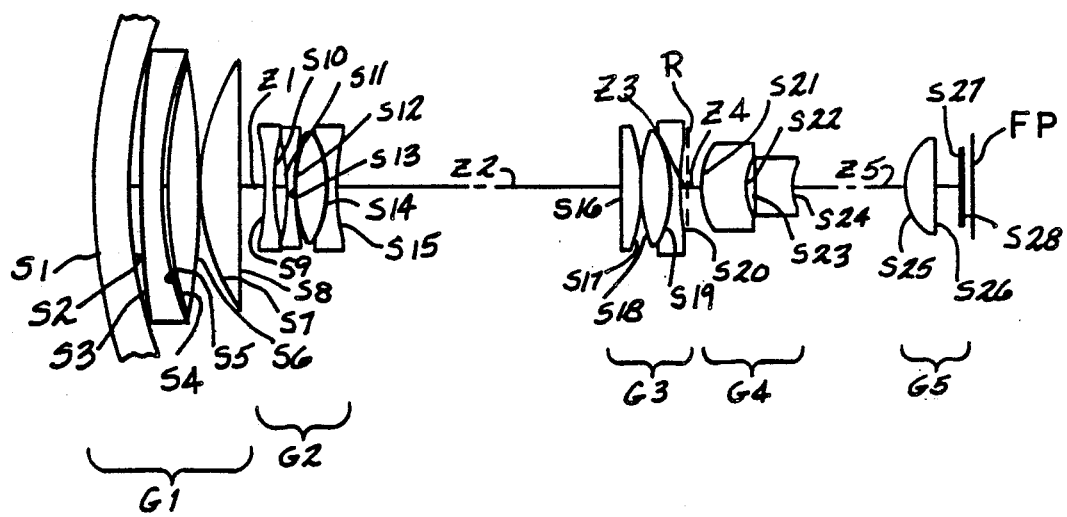

A first lens embodying the invention is shown in FIG. 1 with the lens groups thereof positioned for the longest equivalent focal length (EFL) while FIG. 1a shows the same lens with the lens units at the shortest EFL as will hereinafter be described. A lens embodying the invention has a constant front vertex distance (FVD).

The lens comprises five lens units G1-G5. The first lens unit G1 is stationary for zooming purposes and does not affect the magnification of the lens. The second and third lens units G2 and G3 are moveable to vary the EFL of the lens and alternately provide the primary variating function as hereinafter described. The fourth lens unit G4 is primarily a compensating lens which moves and maintains the image in focus at the focal plane FP.

The fifth lens unit G5 in the embodiment disclosed in FIGS. 1 and 1a comprises a single element L14 plus a filter L15.

The first lens unit comprises four elements L1-L4. The second lens unit G2 comprises four elements L5-L8, with L7 and L8 forming a cemented doublet. The third lens unit comprises three elements L9-L11, with elements L10 and L11 forming a cemented doublet. The fourth lens unit G4 comprises a thick positive meniscus L12 and another thick positive meniscus L13. The fifth lens unit comprises element L14 which is biconvex and is followed by a filter L15 having double plano surfaces.

The zooming spaces are indicated by the reference designation Z1, Z2, Z3 and Z5, which are explained in the following Table I.

In the lens of FIGS. 1 and 1a the zooming spaces are defined in relation to a reference plane R whose location is specified in Table I. In this embodiment, the aperture also moves and its location with respect to reference plane R, for various EFL's is also given with the zoom spacing data in Table I.

The small change in magnification of lens unit G4 leads to small aberration contribution. It will be noted that the movement of lens unit G4 is small as exemplified by zoom spacings Z4 and Z5. The magnification change over the zoom range is less than twenty-five percent, specifically fifteen percent.

In the example of FIGS. 1 and 1a, and Table I, a band pass filter L15 may be provided just before the focal plane FP to provide a pass in the range of 0.65 to 0.90 microns.

The lens of FIGS. 1 and 1a, and Table I may be utilized within a housing with a and have a front housing dome first lens element L1. Therefore, element L1 is shown with broken outer edges. Element L1 is the front closure to the housing for the lens. Lenses embodying the invention may be used to image an object on a vidicon tube or a CCD imaging sensor for viewing on a cathode ray tube (CRT).

Figure 2:
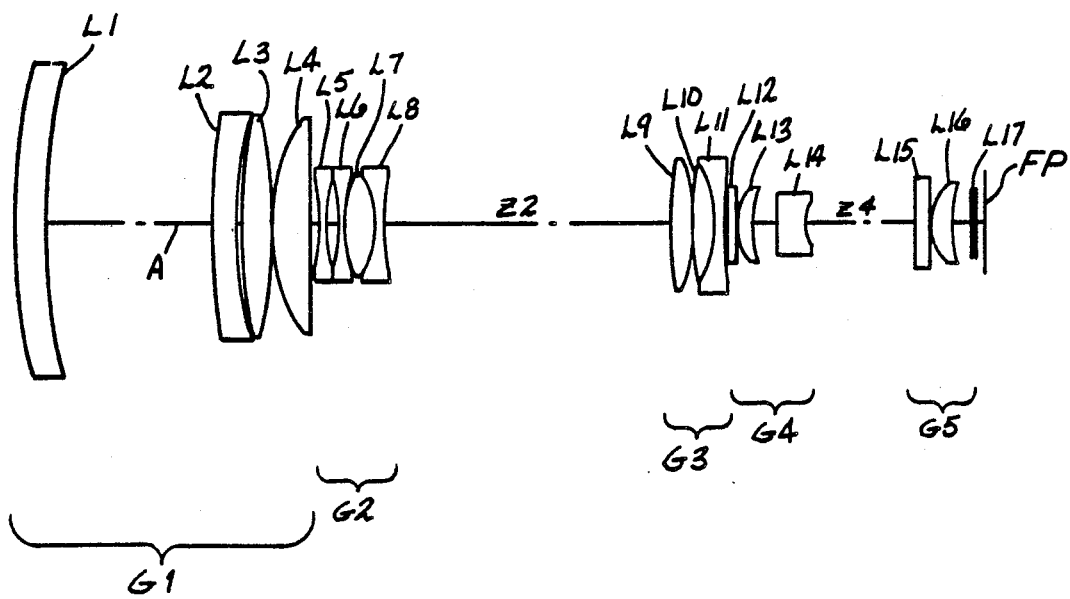
Figure 2A:
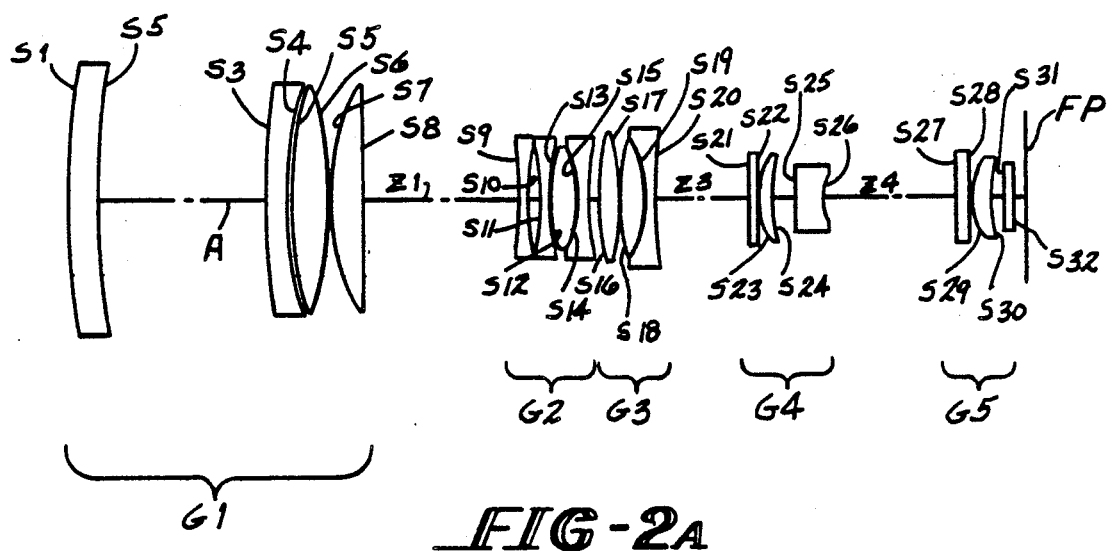

The lens of FIGS. 2 and 2a also includes five lens units G1-G5. The first lens unit G1 includes elements L1-L4, the second lens unit G2 includes elements L5-L8, the third lens unit G3 includes elements L9-L11, the fourth lens unit G4 includes the elements L12-L14, and the fifth lens unit includes elements L15-L17. Element L17 is a band pass filter as previously described in the discussion of FIGS. 1 and 1a, and Table I. Elements L12 and L15 are polarizing filters that may be utilized to attenuate light. A vidicon or other imaging device, such as a CCD semiconductor may be placed at focal plane FP for producing an image on a CRT, as disclosed in U.S. Pat. No. 4,581,648. If the lens is used only under normal light conditions, the polarizing filters L11 and L15 need not be used.

The elements L12 and L15 of FIG. 2 and 2a are cross polarizing and may be relatively rotated for attenuation purposes.

It is to be understood that the polarizers and filters are not necessary to the overall designs of the disclosed lenses, but may be utilized where light attenuation and/or band pass are desired.

In the example of FIGS. 2 and 2a and Table II, the compensator lens unit G4 has a magnification change of less than twenty-five percent from the shortest EFL to the longest EFL, and specifically a magnification change of about fourteen percent. Moreover, it will be noted that the compensator group G4 has little movement as evidenced by the zoom spacing data Z4 in Table II.

In the Figures and the related tables, the lens elements are identified from the image end to the object end by the reference L followed by successive ARabic numerals. Lens surfaces are identified by the reference S followed by successive ARabic numerals from the image to the object end. The disclosed lens of FIGS. 1 and 2 are substantially described in Tables I and II respectively.

In the tables, the dispersion of each lens element as measured by its Abbe number is given by V and the index of refraction of each element is given under the heading N.

Other parameters of the disclosed lenses including lens magnification change with zoom position are also set forth in the tables.

The contributions of the various lens units in regard to change of magnification with varying focal lengths are also set forth in the tables. The term magnification is used in its ordinary sense to means the ratio of the image height of the object to the object height.

It will be noted that lens units G2 and G3 provide the major changes in magnification ratio while the compensating lens unit G4 provides only a minor change in magnification ratio with movement thereof.

In the lens of Table I, lens unit G2 has almost a four to one ratio in magnification from the shortest EFL to the longest EFL, while lens unit G3 has a change in magnification of about two and one half to one or less in the embodiments shown.

TABLE I

| LENS | SURFACE | SURFACE RADII (mm) | AXIAL DISTANCE BETWEEN SURFACES (mm) | $N_d$ | $V_d$ |
|------|---------|--------------------|--------------------------------------|-------|-------|
| L1   | S1      | 96.52              |                                      |       |       |
|      |         |                    | 6.35                                 | 1.517 | 64.2  |
|      | S2      | 90.17              |                                      |       |       |
|      |         |                    | 1.50                                 |       |       |
| L2   | S3      | 163.82             |                                      |       |       |
|      |         |                    | 3.75                                 | 1.699 | 30.1  |
|      | S4      | 59.78              |                                      |       |       |
|      |         |                    | 0.68                                 |       |       |
| L3   | S5      | 75.6               |                                      |       |       |
|      |         |                    | 5.50                                 | 1.487 | 84.5  |
|      | S6      | −110.69            |                                      |       |       |
|      |         |                    | 0.10                                 |       |       |
| L4   | S7      | 36.32              |                                      |       |       |
|      |         |                    | 6.55                                 | 1.487 | 84.5  |
|      | S8      | 929.28             |                                      |       |       |
|      |         |                    | Z1                                   |       |       |
| L5   | S9      | −97.24             |                                      |       |       |
|      |         |                    | 1.80                                 | 1.808 | 40.7  |
|      | S10     | 41.63              |                                      |       |       |
|      |         |                    | 2.10                                 |       |       |
| L6   | S11     | −34.69             |                                      |       |       |
|      |         |                    | 1.39                                 | 1.652 | 58.5  |
|      | S12     | 42.55              |                                      |       |       |
|      |         |                    | 0.10                                 |       |       |
| L7   | S13     | 27.28              |                                      |       |       |
|      |         |                    | 5.81                                 | 1.278 | 28.4  |
|      | S14     | −18.16             |                                      |       |       |
| L8   |         |                    | 1.25                                 | 1.772 | 49.6  |
|      | S15     | 40.49              |                                      |       |       |

TABLE I-continued

| LENS | | SURFACE RADII (mm) | AXIAL DISTANCE BETWEEN SURFACES (mm) | $N_d$ | $V_d$ |
|---|---|---|---|---|---|
| | | | Z2 | | |
| | S16 | 130.21 | | | |
| L9 | | | 3.93 | 1.694 | 53.3 |
| | S17 | −33.52 | | | |
| | | | 0.11 | | |
| | S18 | 40.83 | | | |
| L10 | | | 5.00 | 1.694 | 53.3 |
| | S19 | −19.44 | | | |
| L11 | | | 1.35 | 1.762 | 226.5 |
| | S20 | 111.76 | | | |
| | | | Z3 | | |
| | Reference Plane | | | | |
| | | | Z4 | | |
| | S21 | 12.0 | | | |
| L12 | | | 8.07 | 1.762 | 26.5 |
| | S22 | 13.69 | | | |
| | | | 1.14 | | |
| | S23 | 231.81 | | | |
| L13 | | | 6.27 | 1.808 | 40.7 |
| | S24 | 7.93 | | | |
| | | | Z5 | | |
| | S25 | 10.45 | | | |
| L14 | | | 5.00 | 1.487 | 70.4 |
| | S26 | −117.53 | | | |
| | | | 3.90 | | |
| | S27 | Plano | | | |
| L15 | | | 0.76 | 1.517 | 64.2 |
| | S28 | Plano | | | |
| FP | | | 1.21 | | |

ZOOM SPACING DATA (mm)

| EFL(mm) | Z1(mm) | Z2(mm) | Z3(mm) | Z4(mm) | Z5(mm) | APERTURE |
|---|---|---|---|---|---|---|
| 20 | 0.65 | 52.70 | 0.37 | 1.47 | 18.9 | 0.29 |
| 55 | 23.70 | 31.18 | 1.16 | 8.99 | 11.41 | 1.80 |
| 104 | 27.30 | 17.73 | 8.69 | 2.38 | 18.03 | 0.47 |
| 200 | 29.26 | 0.81 | 23.66 | 0.95 | 19.45 | 0.19 |

Zoom Range = 20-200 mm
Front Vertex Distance = 147.8 mm
F/No. = 1:3.60

GROUP MAGNIFICATIONS

| EFL | 20.0(mm) | 55.0(mm) | 105.0(mm) | 200.0(mm) |
|---|---|---|---|---|
| G1 | .00 | .00 | .00 | .00 |
| G2 | −.43 | −1.12 | −1.49 | −1.82 |
| G3 | −.58 | −.72 | −.88 | −1.35 |
| G4 | 2.25 | 1.92 | 2.21 | 2.27 |
| G5 | .56 | .56 | .56 | .57 |

TABLE II

| LENS | | SURFACE RADII (mm) | AXIAL DISTANCE BETWEEN SURFACES (mm) | $N_d$ | $V_d$ |
|---|---|---|---|---|---|
| | S1 | 164.00 | | | |
| L1 | | | 7.00 | 1.517 | 64.2 |
| | S2 | 157.00 | | | |
| | | | 31.75 | | |
| | S3 | 168.42 | | | |
| L2 | | | 3.65 | 1.699 | 30.1 |
| | S4 | 60.49 | | | |
| | | | .73 | | |
| | S5 | 76.50 | | | |
| L3 | | | 6.50 | 1.487 | 84.5 |
| | S6 | −112.10 | | | |
| | | | .10 | | |
| | S7 | 36.60 | | | |
| L4 | | | 6.55 | 1.487 | 84.5 |
| | S8 | 843.30 | | | |
| | | | Z1 | | |
| | S9 | −95.23 | | | |
| L5 | | | 1.80 | 1.808 | 40.7 |
| | S10 | 42.06 | | | |
| | | | 2.10 | | |
| | S11 | −34.52 | | | |
| L6 | | | 1.39 | 1.652 | 58.5 |
| | S12 | 43.14 | | | |
| | | | .10 | | |
| | S13 | 27.44 | | | |
| L7 | | | 5.81 | 1.728 | 28.4 |
| | S14 | −17.97 | | | |
| L8 | | | 1.25 | 1.761 | 86.3 |

TABLE II-continued

|     |     |         |      |       |      |
| --- | --- | ------- | ---- | ----- | ---- |
|     | S15 | 40.90   |      |       |      |
|     |     |         | Z2   |       |      |
|     | S16 | 134.38  |      |       |      |
| L9  |     |         | 3.20 | 1.694 | 53.3 |
|     | S17 | −33.35  |      |       |      |
|     |     |         | .11  |       |      |
|     | S18 | 41.24   |      |       |      |
| L10 |     |         | 5.00 | 1.694 | 53.3 |
|     | S19 | −19.48  |      |       |      |
| L11 |     |         | 1.35 | 1.762 | 26.5 |
|     | S20 | 113.67  |      |       |      |
|     |     |         | Z3   |       |      |
|     | S21 | Plano   |      |       |      |
| L12 |     |         | 1.00 | 1.517 | 64.2 |
|     | S22 | Plano   |      |       |      |
|     |     |         | .50  |       |      |
|     | S23 | 11.14   |      |       |      |
| L13 |     |         | 2.30 | 1.501 | 37.1 |
|     | S24 | 24.65   |      |       |      |
|     |     |         | 4.92 |       |      |
|     | S25 | 976.60  |      |       |      |
| L14 |     |         | 5.44 | 1.788 | 30.9 |
|     | S26 | 9.57    |      |       |      |
|     |     |         | Z4   |       |      |
|     | S27 | Plano   |      |       |      |
| L15 |     |         | 3.00 | 1.517 | 64.2 |
|     | S28 | Plano   |      |       |      |
|     |     |         | 0.00 |       |      |
|     | S29 | 9.88    |      |       |      |
| L16 |     |         | 4.00 | 1.487 | 70.4 |
|     | S30 | 25.53   |      |       |      |
|     |     |         | 3.90 |       |      |
|     | S31 | Plano   |      |       |      |
| L17 |     |         | .76  | 1.517 | 64.2 |
|     |     | Plano   |      |       |      |
|     |     |         | 1.27 |       |      |
| FP  |     |         |      |       |      |

| ZOOM SPACING DATA (mm) | | | | |
| --- | --- | --- | --- | --- |
| EFL(mm) | Z1(mm) | Z2(mm) | Z3(mm) | Z4(mm) |
| 20.0 | 1.90 | 54.20 | .82 | 20.20 |
| 55.0 | 16.70 | 28.86 | 11.21 | 20.35 |
| 105.0 | 24.96 | 15.81 | 17.39 | 18.96 |
| 200.0 | 29.74 | 2.90 | 18.02 | 26.45 |

Zoom Range = 20–200 mm
Front Vertex Distance = 182.6 mm
F/No. = 1:36–1:50

| GROUP MAGNIFICATIONS | | | | |
| --- | --- | --- | --- | --- |
| EFL | 20.0(mm) | 55.0(mm) | 105.0(mm) | 200.0(mm) |
| G1 | .00 | .00 | .00 | .00 |
| G2 | −.44 | −0.75 | −1.21 | −01.88 |
| G3 | −0.56 | −.92 | −1.11 | −1.20 |
| G4 | 1.85 | 1.86 | 1.81 | 2.07 |
| G5 | .69 | .68 | .69 | .68 |

It may be seen from the zoom spacing data of Tables I and II that the maximum axial movement of the compensating lens units G4 is eight millimeters in Table I and seven and one half millimeters in Table II. This contributes to the short front vertex distance of the lens, and provides greater space for movement of the variator lens units. The maximum axial movement of the compensator lens units is five percent or less than the longest EFL of the lens.

On the example of FIG. 1 and Table I the magnification ratio of lens unit G2 between 20 mm and 105 mm is 3.47, while the magnification ratio between 105 and 200 mm is 1.22. This shows that lens G2 unit in this range (20–105 mm) of the zooming ration provides the primary variating function,
while lens unit G3 in the firs range (20–105 mm) provides a magnification ratio of 1.50, and in the second range (105–200 mm) provides a magnification ratio of 1.58.

Thus, over the complete zoom range the lens units G2 and G3 exchange functions as variating units. Each however, provides a compensating function when not being the primary variator.

The lens units G2 and G3 share the variating function over the entire zoom range while providing a compensating function when not providing the primary variating function.

However, lens unit G4 provides only a compensating function.

In the embodiment of FIG. 2 and Table II, lens unit G2 provides a magnification ratio of 2.75 from 20–105 mm and magnificating ratio of 1.55 from 105–200 mm, while lens unit G3 provides a magnification ratio of 1.98 in the range of 20–105 mm and a magnification ratio of 1.08 in the zoom range of 105–200 mm.

This shows that the lens unit G2 and G3 substantially share the variating function over the total zoom range while also providing a compensating function while not providing the predominant variating function.

In this case lens unit G4 provides the final compensating function.

However, in all cases, lens unit G4 is required to provide a compensating function.

The lens unit G4 with its low power and short axial movement during zooming provides a necessary compensating function for the primary variating lens units G2 and G3 and permits the provision of a zoom lens with an approximate 10:1 zoom range having a very short FVD.

The following Table III sets forth the power of each lens unit as a ratio to the geometrical mean (Km) of the power of the lens which is $$Km = \sqrt{K_s K_L}$$

where $K_s$ is the power of the lens at the shortest EFL and $K_L$ is the power of the lens at the longest EFL.

TABLE III

|  | TABLE I | TABLE II |
|---|---|---|
| $K_1/K_M$ | .995 | 1.001 |
| $K_2/K_M$ | −3.920 | −3.908 |
| $K_3/K_M$ | 2.139 | 2.136 |
| $K_4/K_M$ | −2.895 | −2.051 |
| $K_5/K_M$ | 3.141 | 2.051 |

The first variator lens unit G2 has the greatest absolute power of any of the lens units and therefore upon movement provides the major contribution to change of EFL. The front lens unit G1 has a power ratio to $K_M$ of substantially unity. The compensating lens unit G4 has an absolute power which is substantially equal to the power of the stationary rear lens unit G5. The absolute power of the first variator group G2 is approximately twice that of the second variator lens unit.

All lenses embodying the invention have a long EFL which is substantially greater than the front vertex distance. This exemplifies the compactness of the lens. The disclosed lens are designed for a fixed focus. However, the lens may be designed to be focused to a closer distance by movement of group G1.

It may thus be seen that the objects of the invention set forth, as well as those made apparent from the foregoing description, are efficiently attained. While preferred embodiments of the invention have been set forth for purposes of disclosure, modification to the disclosed embodiments of the invention, as well as other embodiments thereof, may occur to those skilled in the art. Accordingly, the appended claims are intended to cover all embodiments of the invention and modifications to the disclosed embodiments which do not depart from the spirit and scope of the invention.

What is claimed is:

1. A zoom lens comprising from the object end a first positive stationary lens unit, a second negative variating lens unit, a third positive variating lens unit, and a fourth compensating lens unit, said variating lens units and said compensator lens unit being axially moveable to vary the equivalent focal length of said lens, said compensating lens unit, having an object magnification change of less than twenty-five percent over the zoom range of said lens.

2. The lens of claim 1 in which the compensating lens unit is followed by a stationary positive lens unit near the image plane.

3. The lens of claim 2 where the compensating lens unit has overall negative power and the absolute value thereof is approximately equal to the power of the stationary lens unit.

4. The lens of claim 1 where the ratio of the power of said first lens unit to the geometric mean power of said lens is substantially unity.

5. The lens of claim 1 where the object magnification change of said negative variating lens unit over the zoom range of said lens is greater than the object magnification change of said positive variating lens unit.

6. The lens of claim 1 where the absolute power of said negative variating lens unit is substantially twice the power of said positive variating lens unit.

7. The lens of claim 1 wherein said third and fourth lens units include polarizing filters.

8. The lens of claim 7 wherein said polarizing filters are relatively rotatable to attenuate light through said lens.

9. The lens of claim 1 where the zoom range is predetermined, said second lens unit upon movement thereof provides the primary variating function along a part of said predetermined zoom range, and said third lens unit upon movement thereof provides the primary variating function along the other part of said predetermined zoom range.

10. The zoom lens of claim 1 where said first lens unit is axially movable to focus said lens.

11. A zoom lens comprising from the object end, a first positive stationary lens unit, a second negative variating lens unit, a third positive variating lens unit, and a fourth negative compensating lens unit, said variating lens units being axially moveable to vary the equivalent focal length of said lens while said compensating lens unit moves axially to maintain an image in focus, said lens having a front vertex distance smaller than the longest equivalent focal length of said lens, said compensating lens unit having a maximum axial movement over the equivalent focal length range of said lens no greater than five percent of the longest equivalent focal length of said lens.

12. The lens of claim 11 in which the fourth compensating lens unit is followed by a stationary positive lens unit near the image plane.

13. The lens of claim 11 where the compensating group has overall negative power and the absolute value thereof is approximately equal to the power of the stationary lens unit.

14. The lens of claim 11 where the ratio of the power of said first lens unit to the geometric mean power of said lens is substantially unity.

15. The lens of claim 11 where the object magnification change of said, negative variating lens unit over the zoom range of said lens is greater than the object magnification change of said positive variating lens unit.

16. The lens of claim 11 where the absolute power of said negative variating lens unit is substantially twice the power of said positive variating lens unit.

17. The lens of claim 11 where the absolute power of said negative variating lens unit is substantially twice the power of said positive variating lens unit.

18. The lens of claim 17 where the absolute power of said negative variating lens unit is substantially twice the power of said positive variating lens unit.

19. The lens of claim 11 where the zoom range is predetermined, said second lens unit upon movement thereof provides the primary variating function along a part of said predetermined zoom range, and said third lens unit upon movement thereof provides the primary variating function along the other part of said predetermined zoom range.

20. The lens of claim 9 where said compensating lens unit has a maximum movement over the equivalent focal length range of said lens no greater than five percent of the longest equivalent focal length of said lens.

21. The lens of claim 19 where said compensating lens unit has an object magnification change of less than twenty-five percent over the zoom range of said lens.

22. The zoom lens of claim 11 where said first lens unit is axially movable to focus said lens.

23. A zoom lens comprising from the object end a first stationary lens unit, a second variating and compensating lens unit, a third variating lens unit, said second and third lens units being axially movable to vary the equivalent focal length of said lens, a fourth compensating lens unit, said compensating lens unit being axially moveable for image plane compensation and having an object magnification change of less than twenty-five percent over the zoom range of said lens.

24. The lens of claim 23 where the zoom range is predetermined, said second lens unit upon movement thereof provides the primary variating function along a part of said predetermined zoom range, and said third lens unit upon movement thereof provides the primary variating function along the other part of said predetermined zoom range.

25. A zoom lens comprising from the object end a first stationary lens unit, a second variating and compensating lens unit, a third variating lens unit, said second and third lens units being axially movable to vary the equivalent focal length of said lens, a fourth compensating lens unit, said compensating lens unit being axially movable for image plane compensation and having a maximum axial movement over the equivalent focal length range of said lens no greater than five percent of the longest equivalent focal length of said lens.

26. The lens of claim 25 where the zoom range is predetermined, said second lens unit upon movement thereof provides the primary variating function along a part of said predetermined zoom range, and said third lens unit upon movement thereof provides the primary variating function along the other part of said predetermined zoom range.

* * * * *